United States Patent [19]

Herrlinger

[11] Patent Number: 5,136,951
[45] Date of Patent: Aug. 11, 1992

[54] NOSECONE/FAIRING FOR M130 CHAFF AND FLARE DISPENSER

[75] Inventor: Stephen P. Herrlinger, Panama City, Fla.

[73] Assignee: The United States of America as represented by the Secretary of the Air Force, Washington, D.C.

[21] Appl. No.: 686,023

[22] Filed: Mar. 29, 1991

[51] Int. Cl.$^5$ .................... F42B 4/28; F42B 13/00
[52] U.S. Cl. .................... 102/340; 102/505; 102/513; 102/529
[58] Field of Search .............. 102/340, 505, 513, 529; 89/1.53

[56] References Cited

U.S. PATENT DOCUMENTS

| | | | |
|---|---|---|---|
| 3,834,312 | 9/1974 | Simmons | 102/34.1 |
| 3,863,254 | 1/1975 | Turner | 102/34.4 X |
| 4,069,761 | 1/1978 | Jimenez | 102/37.4 |
| 4,178,854 | 12/1979 | Schillreff et al. | 102/34.4 X |
| 4,471,358 | 9/1984 | Glasser | 102/505 X |
| 4,524,670 | 6/1985 | Billard et al. | 89/1.53 |
| 4,597,332 | 7/1986 | Hoffman et al. | 102/505 X |
| 4,796,536 | 1/1989 | Yu et al. | 102/505 X |
| 4,865,328 | 9/1989 | Attinello et al. | 102/374 X |
| 5,040,465 | 8/1991 | Maury | 102/505 X |

*Primary Examiner*—Peter A. Nelson
*Attorney, Agent, or Firm*—Fredric L. Sinder; Donald J. Singer

[57] ABSTRACT

A nosecone/fairing for reducing the aerodynamic drag of an underwing mounted chaff and flare dispenser has the shape of a flattened paraboloid and covers only the generally square front of the chaff and flare dispenser. The nosecone/fairing is made of fiberglass and attaches to the chaff and flare dispenser by mounting holes in the nosecone/fairing located to align with preexisting holes in the unmodified chaff and flare dispenser.

5 Claims, 1 Drawing Sheet

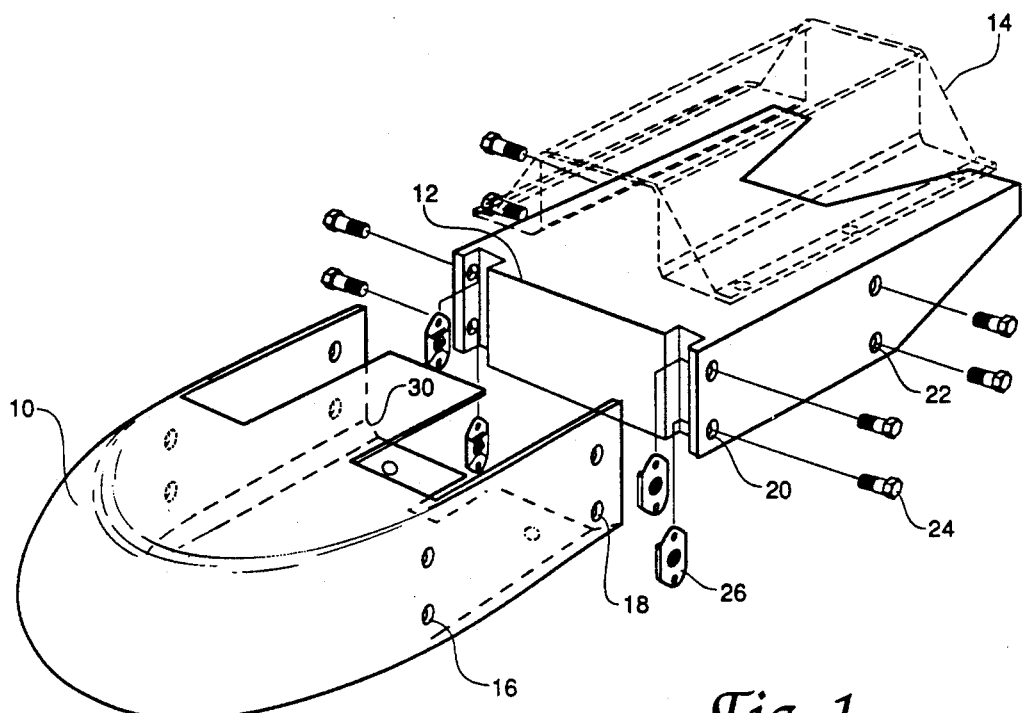
*Fig. 1*
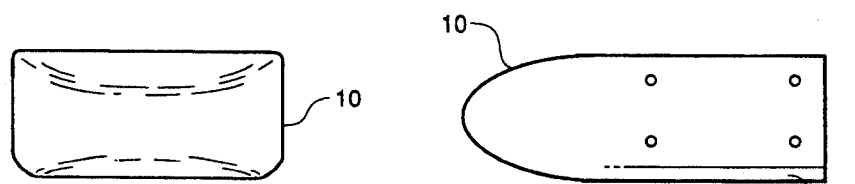
*Fig. 5*   *Fig. 2*
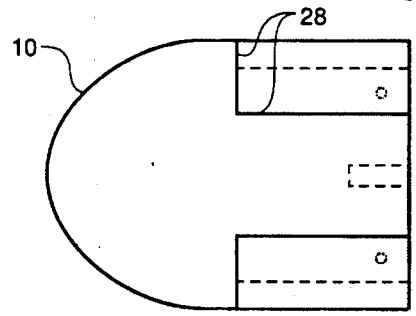
*Fig. 3*
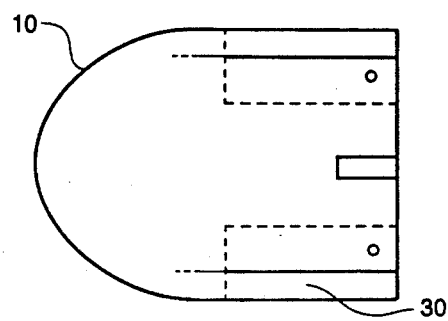
*Fig. 4*

NOSECONE/FAIRING FOR M130 CHAFF AND FLARE DISPENSER

RIGHTS OF THE GOVERNMENT

The invention described herein may be manufactured and used by or for the Government of the United States for all governmental purposes without the payment of any royalty.

BACKGROUND OF THE INVENTION

The present invention relates generally to nosecones and fairings, and more particularly to an accessory nosecone/fairing for mounting on the front of a model M130 chaff and flare dispenser.

Chaff and flares are used as countermeasures against detection by enemy weapon systems. Chaff is used to confuse enemy radar. Flares are used to confuse enemy infrared (heat-seeking) weapons. Chaff and flare dispensers, such as the model M130 chaff and flare dispenser, typically mount underneath the wings of aircraft. The model M130 chaff and flare dispenser was originally developed for use with relatively low-speed Army helicopter gunships and is generally box shaped. It presents a generally rectangular front to the oncoming airstream. The M130 chaff and flare dispenser has since been adapted for use with model MQM-107 drone aircraft. MQM-107 and similar radio-controlled drones are used to provide target practice for fighter aircraft pilots. Adding chaff and flare dispensers to such drones improves their survivability so that they have longer lifetimes and so that fewer drones are needed for pilot training. Also, of course, adding chaff and flare dispensers makes a more realistic practice target. And, by careful selection of chaff and flares, drones can even mimic specific enemy aircraft.

Unfortunately, the boxlike shapes and rectangular fronts of M130 chaff and flare dispensers adds significant wind-resistance to drones, seriously degrading their performance. The prior art has attempted to mount to M130 chaff and flare dispensers accessory nosecone/fairings made out of aluminum flat plate which faired in the front of both the M130 and its wing mounting bracket. This prior art nosecone/fairing did not work successfully and was never used beyond a few test flights.

Thus it is seen that there is a need for an accessory nosecone/fairing for M130, and similar chaff and flare dispensers, that reduces drag and allows higher airspeeds for aircraft carrying M130 and similar dispensers.

It is, therefore, a principal object of the present invention to provide a detachable accessory nosecone/fairing for mounting on the front of model M130 and similar chaff and flare dispensers that significantly reduces drag.

It is a feature of the present invention that it attaches easily to the front of unmodified model M130 chaff and flare dispensers.

It is another feature of the present invention that the strength of both its structure and of its attachment to a model M130 chaff and flare dispenser is far greater than the expected loads in flight.

It is an advantage of the present invention that it is inexpensive to make and straightforward to use.

These and other objects, features and advantages of the present invention will become apparent as the description of certain representative embodiments proceeds.

SUMMARY OF THE INVENTION

The present invention provides an accessory nosecone/fairing for mounting on the front of a model M130 chaff and flare dispenser. A unique discovery of the present invention is that the nosecone or fairing should cover only the dispenser itself, and not also the wing mountings and other parts, so that a minimum frontal area is always presented to the airstream. Another discovery is that the shape of the nosecone should be that of a flattened paraboloid.

Accordingly, the present invention is directed to a nosecone for a chaff and flare dispenser having a substantially rectangular vertical front face, the nosecone comprising a front portion having a top, a bottom, a rear, and generally the shape of a horizontally aligned paraboloid flattened at its top and bottom, wherein a horizontal cross-section of the front portion has generally the shape of a first parabola, a vertical cross-section made parallel with a central axis of the paraboloid has generally the shape of a second parabola, narrower than the first parabola, and a vertical cross-section made perpendicular with the central axis of the paraboloid at the rear of the front portion has generally the shape of a rectangle; a rear portion, extending rearward from the rear of the front portion, having generally the shape of an open rectangular duct; and, means in the rear portion for attaching the nosecone to the front of the chaff and flare dispenser. The rear portion may include a horizontal top side and a pair of vertical lateral sides, wherein the top side includes a pair of cutouts, each cutout adjacent to a different lateral side. The rear portion may also include a horizontal bottom side, wherein the horizontal bottom side is connected to each lateral side by one of a pair of slanted sides. The attaching means may comprise mounting holes positioned so that, when attached to the chaff and flare dispenser, the mounting holes align with pre-existing holes in the dispenser. The nosecone may be made of fiberglass.

DESCRIPTION OF THE DRAWINGS

The present invention will be more clearly understood from a reading of the following detailed description in conjunction with the accompanying drawings wherein:

FIG. 1 is a perspective view of a nosecone/fairing made according to the teachings of the present invention showing its aerodynamic shape and its means for attaching to a M130 chaff and flare dispenser;

FIG. 2 is a side view of the nosecone/fairing of FIG. 1;

FIG. 3 is a top view of the nosecone/fairing of FIG. 1 showing its reduced width top section for fitting between the mounting brackets of the M130 dispenser;

FIG. 4 is a bottom view of the nosecone/fairing of FIG. 1; and,

FIG. 5 is a front view of the nosecone/fairing of FIG. 1.

DETAILED DESCRIPTION

Referring now to FIG. 1 of the drawings, there is shown a perspective view of a nosecone/fairing 10 made according to the teachings of the present invention. Nosecone/fairing 10 will generally be referred to simply as nosecone 10 in the rest of this detailed description. Nosecone 10 attaches to the front of a conventional chaff and flare dispenser 12. Dispenser 12 is, in this embodiment, an unmodified model M130 chaff and flare dispenser 12. Brackets 14, shown in mostly schematic dashed outline in this view, mount dispenser 12 to the underside of an aircraft wing or other external aircraft structure.

FIG. 2 is a side view of nosecone 10 showing the generally parabolic shape of a vertical cross-section of its front portion, and FIG. 3 is a top view of nosecone 10 showing the generally wider parabolic shape of a horizontal cross-section of its front portion. FIG. 4 is a bottom view of nosecone 10 also showing the generally wider parabolic shape of a horizontal cross-section of its front portion. FIG. 5 is a front view of nosecone 10. FIGS. 1, 2, 3, 4 and 5 also show the generally open rectangular duct shape of the rear portion of nosecone 10.

To attach to dispenser 12, nosecone 10 is slid backwards over dispenser 12 until holes 16 and 18 align with preexisting holes 20 and 22 in dispenser 12. Side screws 24 secure nosecone 10 in place. Bottom screws, not shown, also secure nosecone 10. Nut plates 26 are used behind side holes 16 to provide a structure to screw into for screws 24. In this embodiment, nut plates 26 are secured to dispenser 12 with double-sided tape. A total of ten attachment points are used in the described embodiment.

The top rear portion of nosecone 10 is made slightly narrower than the width of nosecone 10 to form cutouts 28 for providing clearance for mounting brackets 14. The side walls and bottom of nosecone 10 includes angled sides 30 to conform to a similarly shaped portion of dispenser 12.

In the described embodiment, nosecone 10 was made of fiberglass using conventional construction methods. A wooden mold was made in the desired shape, but slightly undersized to match the desired final inside dimensions of nosecone 10. A first layer of fiberglass cloth was applied over the mold to protect it and then sprayed with mold release compound. Six layers of bidirectional fiberglass cloth were then laid up over the mold and fixed with epoxy resin and a curing agent. The fiberglass cloth used for each layer in this embodiment had a nominal thickness of 0.063 inches. Countersunk washers were attached to the fiberglass around each mounting hole as reinforcement.

Nosecone 10 has a total length front to rear of 11¾ inches. It has a total width of 8 7/8 inches and a total height top to bottom of 5 inches. The front portion is 6 inches long and the rear portion 5¾ inches long. The width of each cutout 28 is 2½ inches.

In use, nosecone 10 so reduced the drag of a M130 chaff and flare dispenser mounted on a MQM-107D subscale drone that the top airspeed of the drone, under one set of flight conditions, increased from 310 knots to 355 knots.

The disclosed nosecone/fairing successfully demonstrates the use of a flattened paraboloid shaped nosecone that is sized to just cover the front of a chaff and flare dispenser, and includes a specially shaped rear portion to rigidly attach to the dispenser, for reducing the drag on an aircraft drone mounted chaff and flare dispenser for higher speeds and increased survivability. Although the disclosed apparatus is specialized, its teachings will find application in other areas where aerodynamic drag needs to be reduced.

It is understood that various modifications to the invention as described may be made, as might occur to one with skill in the field of the invention, with the scope of the claims. Therefore, all embodiments contemplated have not been shown in complete detail. Other embodiments may be developed without departing from the spirit of the invention or from the scope of the claims.

I claim:

1. A nosecone for a chaff and flare dispenser having a substantially rectangular vertical front face, comprising:
   (a) a front portion having a top, a bottom, a rear, and generally the shape of a horizontally aligned paraboloid flattened at its top and bottom, wherein a horizontal cross-section of the front portion has generally the shape of a first parabola, a vertical cross-section made parallel with a central axis of the paraboloid has generally the shape of a second parabola, narrower than the first parabola, and a vertical cross-section made perpendicular with the central axis of the paraboloid at the rear of the front portion has generally the shape of a rectangle;
   (b) a rear portion, extending rearward from the rear of the front portion, having generally the shape of an open rectangular duct; and,
   (c) means in the rear portion for attaching the nosecone to the front of the chaff and flare dispenser.

2. The nosecone according to claim 1, the rear portion having a horizontal top side and a pair of vertical lateral sides, wherein the top side includes a pair of cutouts, each cutout adjacent to a different lateral side.

3. The nosecone according to claim 1, the rear portion having a horizontal top side, a horizontal bottom side, and a pair of vertical lateral sides, wherein the horizontal bottom side is connected to each lateral side by one of a pair of slanted sides.

4. The nosecone according to claim 1, wherein the attaching means comprise mounting holes positioned so that, when attached to the chaff and flare dispenser, the mounting holes align with pre-existing holes in the dispenser.

5. The nosecone according to claim 1, wherein the nosecone is made of fiberglass.

* * * * *